US012253786B2

United States Patent
Zhang et al.

(10) Patent No.: US 12,253,786 B2
(45) Date of Patent: Mar. 18, 2025

(54) INTEGRATED ELECTRO-OPTIC FREQUENCY COMB GENERATOR

(71) Applicant: HyperLight Corporation, Cambridge, MA (US)

(72) Inventors: Mian Zhang, Cambridge, MA (US); Christian Reimer, Wellesley, MA (US); Kevin Luke, Cambridge, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 18/213,771

(22) Filed: Jun. 23, 2023

(65) Prior Publication Data

US 2024/0012308 A1  Jan. 11, 2024

Related U.S. Application Data

(63) Continuation of application No. 17/701,952, filed on Mar. 23, 2022, now Pat. No. 11,733,586, which is a
(Continued)

(51) Int. Cl.
*G02F 1/365* (2006.01)
*G02F 1/035* (2006.01)
(Continued)

(52) U.S. Cl.
CPC .............. *G02F 1/365* (2013.01); *G02F 1/035* (2013.01); *G02F 1/225* (2013.01); *G02F 1/3551* (2013.01);
(Continued)

(58) Field of Classification Search
CPC ...... G02F 1/3551; G02F 1/365; G02F 2203/56
See application file for complete search history.

(56) References Cited

U.S. PATENT DOCUMENTS

| 5,168,534 A | 12/1992 | McBrien |
| 5,278,923 A | 1/1994 | Nazarathy |

(Continued)

FOREIGN PATENT DOCUMENTS

JP  2006330523  12/2006

OTHER PUBLICATIONS

Savatinova et al. "Electro-Optic Effect in Proton Exchanged LiNbO3 and LiTaO3 Waveguides", Journal of Lightwave Technology, vol. 14, No. 3, Mar. 1996, pp. 403-406.
(Continued)

*Primary Examiner* — Daniel Petkovsek
(74) *Attorney, Agent, or Firm* — Van Pelt, Yi & James LLP (57) ABSTRACT

An integrated electro-optic frequency comb generator based on ultralow loss integrated, e.g. thin-film lithium niobate, platform, which enables low power consumption comb generation spanning over a wider range of optical frequencies. The comb generator includes an intensity modulator, and at least one phase modulator, which provides a powerful technique to generate a broad high power comb, without using an optical resonator. A compact integrated electro-optic modulator based frequency comb generator, provides the benefits of integrated, e.g. lithium niobate, platform including low waveguide loss, high electro-optic modulation efficiency, small bending radius and flexible microwave design.

20 Claims, 7 Drawing Sheets

Related U.S. Application Data continuation of application No. 17/016,234, filed on Sep. 9, 2020, now Pat. No. 11,307,484.

(60) Provisional application No. 62/898,051, filed on Sep. 10, 2019.

(51) Int. Cl.
  *G02F 1/225* (2006.01)
  *G02F 1/355* (2006.01)

(52) U.S. Cl.
  CPC ...... *G02F 2201/16* (2013.01); *G02F 2203/56* (2013.01)

(56) References Cited

U.S. PATENT DOCUMENTS

| | | | |
|---|---|---|---|
| 7,471,853 B2 | 12/2008 | Sugiyama | |
| 7,603,002 B2 | 10/2009 | Sugiyama | |
| 7,630,587 B2 | 12/2009 | Sugiyama | |
| 8,346,025 B2* | 1/2013 | Gill | G02F 1/2257 438/31 |
| 8,760,752 B2 | 6/2014 | Chen | |
| 8,781,325 B2 | 7/2014 | Yu | |
| 9,036,954 B2* | 5/2015 | Kobrinsky | G02F 1/035 385/3 |
| 9,746,743 B1 | 8/2017 | Rabiei | |
| 11,307,484 B2 | 4/2022 | Zhang | |
| 11,733,586 B2* | 8/2023 | Zhang | G02F 1/365 359/326 |
| 2002/0094649 A1 | 7/2002 | Arthanari | |
| 2002/0191262 A1 | 12/2002 | Yamada | |
| 2003/0030882 A1 | 2/2003 | Garrett | |
| 2003/0142384 A1 | 7/2003 | Kurebayashi | |
| 2004/0105476 A1 | 6/2004 | Wasserbauer | |
| 2006/0210212 A1 | 9/2006 | Sugiyama | |
| 2008/0317399 A1 | 12/2008 | Sugiyama | |
| 2009/0231686 A1 | 9/2009 | Atkins | |
| 2012/0318983 A1 | 12/2012 | Ouchi | |
| 2016/0077403 A1* | 3/2016 | Metcalf | G02F 2/02 359/326 |
| 2019/0025615 A1* | 1/2019 | Kawamura | G02F 1/025 |

OTHER PUBLICATIONS

Search Report from corresponding International Application No. PCT/US2020/050006, mailed Dec. 4, 2020.

* cited by examiner

INTEGRATED ELECTRO-OPTIC FREQUENCY COMB GENERATOR

CROSS-REFERENCE TO RELATED APPLICATIONS

This application is a continuation of U.S. patent application Ser. No. 17/701,952, now U.S. Pat. No. 11,733,586, entitled INTEGRATED ELECTRO-OPTIC FREQUENCY COMB GENERATOR filed Mar. 23, 2022, which is a continuation of U.S. patent application Ser. No. 17/016,234, now U.S. Pat. No. 11,307,484, entitled INTEGRATED ELECTRO-OPTIC FREQUENCY COMB GENERATOR filed Sep. 9, 2020, which claims priority to U.S. Provisional Patent Application No. 62/898,051, entitled INTEGRATED ELECTRO-OPTIC FREQUENCY COMB GENERATOR filed Sep. 10, 2019, all of which are incorporated herein by reference for all purposes.

TECHNICAL FIELD

The present invention relates to optical devices and electro-optic frequency comb generators, and in particular to an integrated electro-optic frequency comb generator.

BACKGROUND

An electro-optic modulator (EOM) is an optical device in which an electro-optic element is used to modulate a beam of light using an electrical, e.g. voltage, signal. The modulation may be imposed on the phase, frequency, amplitude, or polarization of the beam. Modulation bandwidths extending into the gigahertz range are possible with the use of high bandwidth modulators. The electro-optic effect is the change in the refractive index of the E/O material in the electro-optic element resulting from the application of a DC or alternating electric field. The refractive index change is caused by forces that distort the position, orientation, or shape of the molecules constituting the E/O material. The simplest kind of E/O material comprises a crystal, such as lithium niobate, whose refractive index is a function of the strength of the local electric field. Accordingly, if lithium niobate is exposed to an electric field, light will travel through it more slowly or quickly depending on the direction of the field. Moreover, the phase of the light leaving the crystal is directly proportional to the length of time the light takes to pass therethrough. Therefore, the phase of the laser light exiting an EOM can be controlled by changing the electric field in the crystal.

The electric field can be created by placing a parallel plate capacitor across the crystal. Since the field inside a parallel plate capacitor depends linearly on the potential, the index of refraction depends linearly on the field, and the phase depends linearly on the index of refraction, the phase modulation must depend linearly on the potential applied to the E/O material. The voltage required for inducing a phase change of $\pi$ is called the half-wave voltage $V\pi$.

Intensity modulation (IM) modulates light using an RF modulation signal at frequency $\omega$, with an amplitude about $V_\pi$ of that modulator, where $V_\pi$ is the minimum voltage required to change the intensity from a minimum to a maximum in the IM, i.e. changing the relative phase between the two arms of a Mach-Zehnder interferometer by $\pi$ The IM can receive a continuous wave (CW) optical signal and can generate a sinusoidal varying intensity profile at the output.

Phase modulation (PM) is a modulation pattern that encodes information as variations in the instantaneous phase of a carrier wave. The phase of a carrier signal is modulated to follow the changing voltage level (amplitude) of modulation signal. The peak amplitude and frequency of the carrier signal remain constant, but as the amplitude of the information signal changes, the phase of the carrier changes correspondingly. The analysis and the final result (modulated signal) are similar to those of frequency modulation. A very common application of EOMs is for creating sidebands in a monochromatic laser beam. A sideband is a band of frequencies higher than or lower than the carrier frequency, containing power as a result of the modulation process. The sidebands carry the information (modulation) transmitted by the signal. The sidebands consist of all the Fourier components of the modulated signal except the carrier. All forms of modulation produce sidebands.

An optical frequency comb is a coherent light source composed of multiple phase-locked optical carriers with equidistant frequency spacing. Frequency comb generators are important for a wide range of applications from telecommunication to sensing.

Since EOMs generate phase-locked optical side-bands with equidistant spacing defined by the modulation frequency, they can be used for the generation of optical frequency combs. Conventionally, generating electro-optic frequency combs is possible using cascaded electro-optic intensity and phase modulators, typically comprising bulk modulators made of lithium niobate. By cascading an intensity and a few phase modulators connected through optical fibers, a spectrally flat frequency comb can be generated through purely electro-optic modulation with a conversion efficiency close to one due to the lack of resonators. However, the drawbacks of this method include narrow comb width, high microwave driving power requirement due to multiple phase shifters and amplifiers, complex microwave components for tuning microwave phases and high optical insertion loss due to interconnecting discrete intensity modulators and phase modulators.

The frequency comb generators based on cascaded intensity and phase-modulators generate comb lines by combining intensity and phase modulation. These generators so far are based off chip and are inefficient, expensive, power hungry and have limited comb bandwidth.

An object of the present invention is to overcome the shortcomings of the prior art by providing an integrated on-chip comb generator providing efficient, inexpensive, low-power and wide bandwidth comb generation.

SUMMARY OF THE INVENTION

Accordingly, the present invention relates to an optical device including a substrate, a device layer on the substrate, and a plurality of waveguide-based, electro-optic modulators connected in series by a waveguide structure in the device layer.

In some embodiments, the plurality of electro-optic modulators are configured to receive light from at least one continuous wave light source, and generate a plurality of optical frequencies, said optical device comprising a frequency comb generator.

In some embodiments, each of the plurality of electro-optic modulators includes an RF electrode, a first electro-optic modulator coupled in series by said waveguide structure to a second electro-optic modulator, the RF electrode of the first electro-optic modulator and the RF electrode of the second electro-optic modulator coupled electrically to each other or shared between the first electro-optic modulator and the second electro-optic modulator.

BRIEF DESCRIPTION OF THE DRAWINGS

The invention will be described in greater detail with reference to the accompanying drawings which represent preferred embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

An integrated electro-optic frequency comb generator may include an ultralow loss integrated thin-film lithium niobate or lithium tantalate platform, which may be fabricated in accordance with the methods disclosed in WO 2018/031916 filed Aug. 11, 2017 by Wang et al., which is incorporated herein by reference. The platform enables low power consumption comb generation spanning over a wider range of optical frequencies. The compact integrated electro-optic modulator based frequency comb generator, provides the benefits of an integrated lithium niobate or lithium tantalate platform including low waveguide loss, high electro-optic modulation efficiency, small bending radius, and flexible microwave design.

Figure 1A:
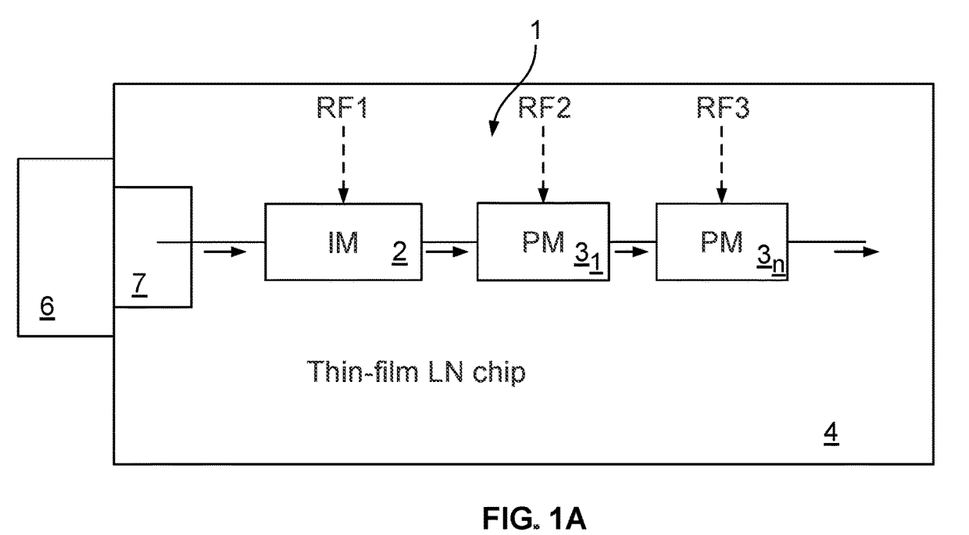
FIG. 1A is a schematic of a multiple RF signal driven cascaded amplitude and phase modulator series that is used to generate a frequency comb in the optical domain.
Figure 1B:
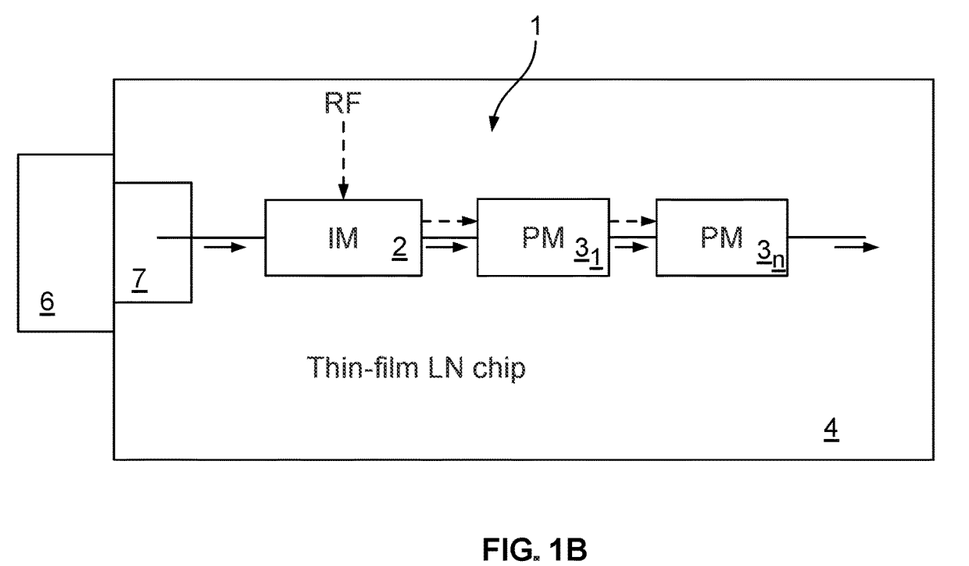
FIG. 1B is a schematic of a single RF signal driven cascaded amplitude and phase modulator series that is used to generate a frequency comb in the optical domain.

With reference to FIGS. 1A and 1B, the integrated frequency comb generator 1, comprises one or more integrated electro-optic intensity or amplitude modulators (IM) 2, and one or more phase modulators (PM) $3_1$ to $3_n$ configured to provide maximum modulation efficiency, ideally provided on a single chip 4 as a continuous waveguide structure. The IM 2 may be first modulated by an RF modulation signal at frequency co, with an amplitude about $V_\pi$ of that modulator, where $V_\pi$ is the minimum voltage required to change the intensity from a minimum to a maximum in the IM 2, i.e. changing the relative phase between the two arms of a Mach-Zehnder interferometer by $\pi$ The IM 2 receives a continuous wave (CW) optical signal, e.g. a center wavelength at 1550 nm, from a CW light source 6, and optionally passed through a polarizing optical element (polarizer) 7 to ensure all of the light is at a same polarization. The modulation generates a sinusoidal varying intensity profile, e.g. a pure tone, in the output from the IM 2. The intensity modulated light is then sent through the at least one PM 3, preferably a plurality of PM's $3_1$ to $3_n$, each of which operates at frequency co, that defines the spectral separation of the comb lines or the wavelength channel spacing, e.g. 10-100 GHz, to generate multiple symmetrical sidebands in the frequency spectrum on each side of the center frequency, space apart by frequency ω. Each PM $3_1$ to $3_n$ may be driven by a common or phase locked RF source (RF1, RF2, RF3) that is phase matched to the incoming intensity modulated light so that the phase modulation spectrally broadens the pulses generated in the IM 2, as illustrated in FIG. 1A. In some variations, such as that depicted in FIG. 1A, the lengths of the optical path between devices allow RF1, RF2, and RF3 to be substantially identical, in other variations the phases are separately tuned to match the delays caused by those lengths of the optical paths between the devices. In some variations, such as that depicted in FIG. 1B, a single RF source is used, and the RF signal passes through the IM 2 and each of the at least one PM 3 in a cascaded manner in a similar fashion that the optical signal passes through the cascaded devices, in the same direction (as indicated) and having the same effective path lengths. This may be achieved by using common electrodes spanning multiple devices, or via signal lines coupling the electrodes of each cascaded device to the next. This results in a broad and flat comb spectrum that has near unity optical conversion efficiency. The comb may then be coupled off the chip 4 or may be further processed on the same chip 4. The order of IM 2 and PM's $3_1$ to $3_n$ may be reversed, e.g. the CW laser 6 may initially pass light to the PM's $3_1$ to $3_n$ and then to the IM 2. By integrating the IM 2 and the PM's $3_1$ to $3_n$, respectively, e.g. on a thin-film lithium niobate (LN) chip 4, optical insertion loss is greatly reduced between them and many more geometries for efficient modulation become possible. The CW light source 6 and the polarizing optical element 7 may also be on the same LN chip 4 or one or more separate chips optically coupled to the LN chip 4. It should be noted that in designs using multiple RF sources, such as that depicted in FIG. 1A, the phases between these RF sources should be at the right values, which implies tuning of the optical waveguide paths and/or expensive RF phase shifters need to be used for each driver port, increasing complexity, whereas for the single RF source design, such as that depicted in FIG. 1B, at most the lengths of the electrodes and/or RF signal lines should be tuned appropriately.

The chip-scale design allows several innovative features. First is the tight bending radii, e.g. a radius of 3 μm to 2 mm, preferably 10 μm to 500 μm, and more preferably 20 μm to 200 μm, enables the waveguides to be folded back around, cross and point in different directions reducing the size to only a small area of the chip. Second is that each active element can be dramatically reduced in size due to the increased efficiency and high-level of integration, enabling a plurality of PM's to be located in close proximity, thereby generating additional sidebands, i.e. a wide spectrum bandwidth. Third, the ultralow loss waveguides enable devices with very long effective lengths to be constructed without introducing excessive optical waveguide insertion loss. Fourth, the co-integration of microwave transmission line and multiple waveguide elements enables new design geometries that dramatically increases comb generation efficiencies and reduces microwave driver complexities.

Figure 2A:
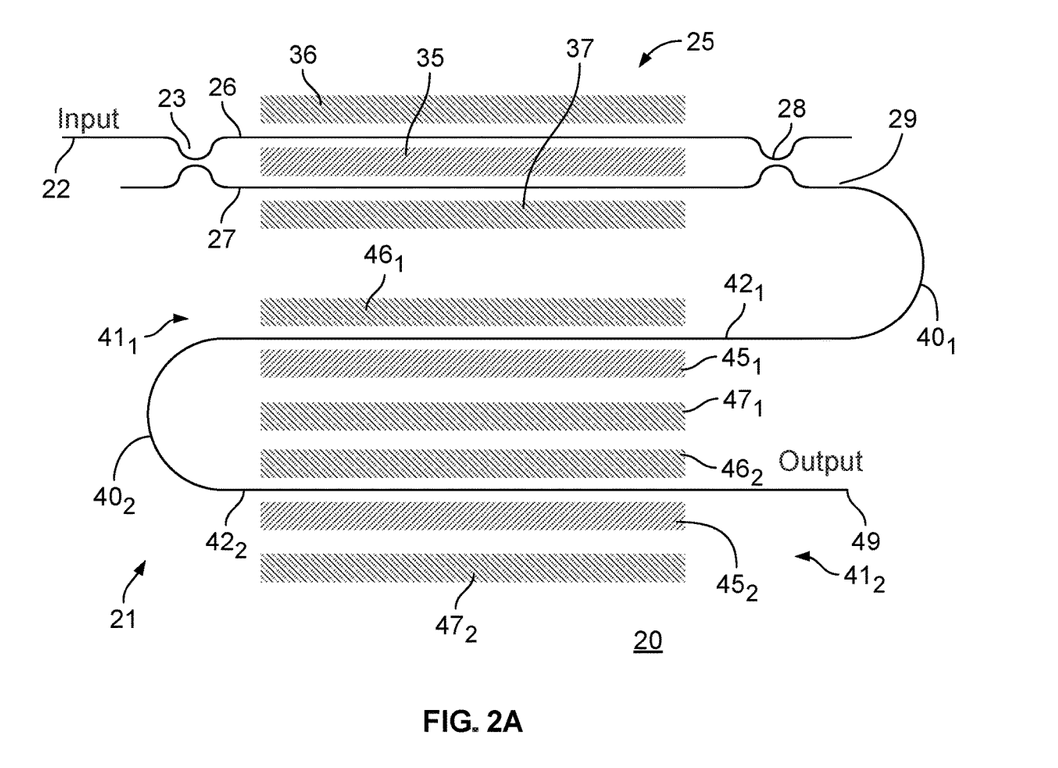
FIG. 2A is an example of a comb generator with cascaded amplitude and phase modulators on chip.

FIG. 2A illustrates an example of an integrated frequency comb generator 21 including connecting waveguides with tight bending radii, as hereinbefore defined. The comb generator 21 includes at least one IM 25, providing the function of IM 2, comprising an input waveguide or port 22 optically coupled to a first coupler 23, e.g. a Y-splitter or a 2×2 coupler with one arm terminated, for splitting an input optical signal into first and second sub-beams, which propagate along first and second arms 26 and 27, respectively, to a second coupler 28, e.g. a Y-splitter or 2×2 coupler, for recombining, e.g. interfering, the first and second sub-beams for output an IM output waveguide or port 29. Each of the first and second arms 26 and 27 may comprise single mode waveguide section or a combination of single mode narrow waveguide sections, e.g. 400 nm to 1000 nm wide, with a cross sectional area <3 $\mu m^2$, preferably less than 1 $\mu m^2$, and multimode wide waveguide sections, 1000 nm to 4000 nm wide and a cross sectional area of >0.5 $\mu m^2$ and <10 $\mu m^2$. The single and multimode sections may include non-trivial guiding structures, such as splitters, bends, and multimode interferometers (MMI). Ideally, the narrow waveguide sections may only support one TE mode and one TM mode with optical propagation loss <0.6 dB/cm, and optical propagation loss >1 dB/cm for higher modes. The wide waveguide sections support more than one TE mode and more than one TM mode with optical propagation loss <0.6 dB/cm for all modes.

The multimode sections may be significantly longer than the single mode sections, e.g. commonly by a factor of 10 to 100; figures are not to scale. The multimode sections may include simple structures, e.g. a straight line and potentially shallow bends. The multimode sections and the single mode sections are connected with tapers, which may be designed such that only the fundamental mode of the multimode waveguide is excited. Ideally, multimode sections are provided adjacent to, beside or below, a signal electrode 35 and ground electrodes 36 and 37 for employing the electro-optic nonlinearity of the waveguide material, thereby defining electro-optic sections of the waveguide structure, and the single mode sections comprise curved sections defining connecting sections of the waveguide structure connecting the multimode, i.e. electro-optic, sections without any electrodes adjacent thereto.

The IM output waveguide 29 may be optically coupled to a first tight curved, i.e. tight bending radii as above, waveguide $40_1$, which optically couples the IM 21 to a first PM section $41_1$ of a plurality of PM sections $41_1$ to $41_n$, providing the functions of one or more PMs $3_1$ to $3_n$. The first PM section $41_1$ includes a first PM waveguide $42_1$, which may comprise a single mode waveguide section or a combination of single mode narrow waveguide sections, and multimode wide waveguide sections, as hereinbefore defined. The multimode sections and the single mode sections are connected with tapers, which may be designed such that only the fundamental mode of the multimode waveguide is excited. Ideally, multimode sections are provided adjacent to, beside or below, signal electrode $45_1$ and first and second ground electrodes $46_1$ and $47_1$.

Particular examples of such tapers would include linear tapering of the waveguide width, cubic tapering of the waveguide width or exponential tapering, as well as other nonlinear tapering methods. The tapering should be gradual enough to allow modes to be adiabatically converted from the single mode to the fundamental TE or TM mode of the multimode section without excessive tapering loss or excitation of optical modes other than the fundamental TE and TM modes.

The output of the first PM waveguide $42_1$ may be optically coupled to a second tight curved, i.e. tight bending radii, connecting waveguide $40_2$, which optically couples the first PM section $41_1$ to a second PM section $41_2$ of the plurality of PM sections, providing the functions of one or more of PMs $3_1$ to $3_n$. Each PM section $41_1$ to $41_n$ may be a separate PM or a portion of a combined PM with adjacent PM sections. The second PM section $41_2$ includes a second PM waveguide $42_2$, which may comprise a single mode waveguide section or a combination of single mode narrow waveguide sections, and multimode wide waveguide sections, as hereinbefore defined. The multimode sections and the single mode sections are connected with tapers, which may be designed such that only the fundamental mode of the multimode waveguide is excited. Ideally, multimode sections are provided adjacent to, beside or below, signal electrode $45_2$ and first and second ground electrodes $46_2$ and $47_2$. The second ground electrode $47_1$ from the first PM $41_1$ may be the same or shared with the first ground electrode $46_2$ from the second PM $41_2$.

The output of the second section PM $41_2$ may be optically coupled to another PM or PM section or to a comb output waveguide or port 49. The first and second tight curved waveguides $40_1$ and $40_2$, i.e. tight bend radii as above, enable the first PM section $41_1$ to be folded back beside the IM 25, and the second PM section $41_2$ to be folded back beside the first PM section $41_1$, whereby the first and second arms 26 and 27 and the PM waveguides $42_1$ and $42_2$ may be parallel to each other, and all of the electrodes 35, 36, 37, $45_{1-n}$, $46_{1-n}$, and $47_{1-n}$ may extend parallel to each other separated by a sufficient distance so as to eliminate or at least limit interference therebetween. The first and second tight curved connecting waveguides $40_1$ and $40_2$ are curved around so that the aspect ratio of the comb generator 21 may be more square. Parallel electrodes are ideal for PM sections $41_1$ to $41_n$ in which the crystal axis extends in the plane of the device layer 11, but for PM sections $41_1$ to $41_n$ in which the crystal axis extends out of the plane of the device layer 11, e.g. Y-cut, the electrodes 35, 36, 37, $45_{1-n}$, $46_{1-n}$, and $47_{1-n}$ may run in any direction.

The difference in black level for the shaded regions in the signal electrodes 35 and $45_{1-n}$, and the ground electrodes 36, 37, $46_{1-n}$, and $47_{1-n}$ indicates different electrode polarity. The electrodes are formed either in a capacitive fashion or configured in a transmission line design. In the transmission line design the microwave travels together with the light where their group velocity is roughly matched. The illustrated IM 25, first PM $41_1$ and second PM $41_2$ may comprise X or Y-cut (or any angle therebetween) Lithium Niobate (LiNbO$_3$ or LN), Lithium Tantalate (LT) or other electro-optic material with an electro-optic constant >10 pm/V, such as ferroelectric materials, design including the central signal electrodes 35 and $45_n$, respectively, adjacent to the outer edges of the first and second arms 26 and 27, and the PM waveguides $42_1$ and $42_2$, respectively, whereby the electric field is oriented along the X or Y axis, i.e. parallel to the device layer 11; however, a Z-cut LN or LT design with the signal electrode 35, and $45_{1-n}$ and one of the ground electrodes over top of the first and second arms 26 and 27, or the PM waveguides $42_1$ and $42_2$, respectively, extending in any direction, e.g. parallel, perpendicular or any angle therebetween, whereby the electric field is oriented along the z axis, i.e. perpendicular to the device layer 11, is also within the scope of the invention. Ideally, the electro-optic material in the waveguide structure is oriented such that the crystalline axis with the largest electro-optic coefficient (Z-axis) is parallel, e.g. X or Y cut, to the plane of the device layer 11 with the electrodes 35, $45_{1-n}$, 36, 37, $46_{1-n}$, and $47_{1-n}$ disposed adjacent to the waveguide structure on either side thereof configured to generate an electric field along the Z-axis or oriented such that the crystalline axis with the largest electro-optic coefficient (Z-axis) is perpendicular, e.g. Z cut, to the plane of the device layer 11 with the electrodes 35, $45_{1-n}$, 36, 37, $46_{1-n}$, and $47_{1-n}$ disposed over top of or under the waveguide structure configured to similarly generate an electric field along the Z-axis.

Any other waveguide material, e.g. silicon, and electrode control for transmitting an electronic modulation signal to the optical signal is within the scope of the invention. Preferably, the waveguides comprising the input waveguide 22, the first coupler 23, the first and second arms 26 and 27, the second coupler 28, the IM output waveguide 29, the first and second tight curved waveguides $40_1$ and $40_2$, and the first and second PM waveguides $42_1$ and $42_2$ are comprised of thin film lithium niobate or lithium tantalate, which may be fabricated in accordance with the methods disclosed in WO 2018/031916 filed Aug. 11, 2017 by Wang et al.

Figure 2B:
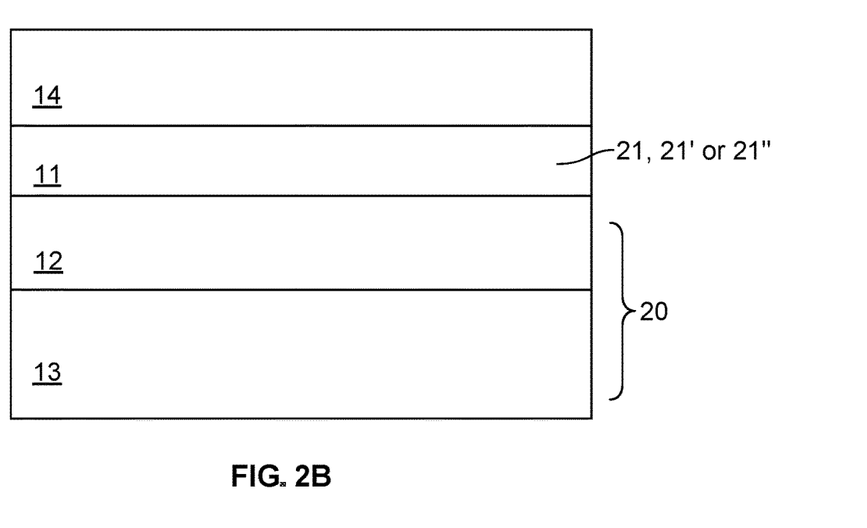
FIG. 2B is a side view of the comb generator of FIG. 2A.

With reference to FIG. 2B, ideally, the comb generator 21 is formed in a device layer 11 on a substrate 20, including a lower cladding layer 12 and a handle layer 13. In a preferred embodiment, the waveguides 22, 23, 26, 27, 28, 29, $40_{1-n}$, and $42_{1-n}$ may be comprised of electro-optics materials (Pockels materials) with an electro-optic constant >10 pm/V, such as single crystal Lithium Niobate ($LiNbO_3$ or LN) or Lithium Tantalate ($LiTaO_3$ or LT), and the device layer 11 with the substrate 20 is comprised of a thin-film electro-optic material on insulator structure, such as Lithium Niobate on insulator (LNOI) structure (or Lithium Tantalate on insulator structure (LTOI)), including a silicon dioxide ($SiO_2$) lower cladding layer on a silicon (Si) handle layer. Note that the substrate 20 can be other materials such as quartz, sapphire, fused silica. The lower cladding layer 12 can be any planarized material that has a lower refractive index than the waveguide material, including, LN or LT and air (suspended structures). An upper cladding layer 14 with lower refractive index than the waveguide, e.g. LN or LT, material, e.g. an upper $SiO_2$, may also be provided covering the modulator structure, i.e. first and second arms 26 and 27, and first and second couplers 23 and 28 in the device layer 11. However, other suitable waveguide materials exhibiting electro-optic effect with an electro-optic coefficient >10 pm/V, such as gallium arsenide (GaAs), indium phosphide (InP) and barium titanate (BTO, $BaTiO_3$), are also within the scope of the invention.

Figure 3:
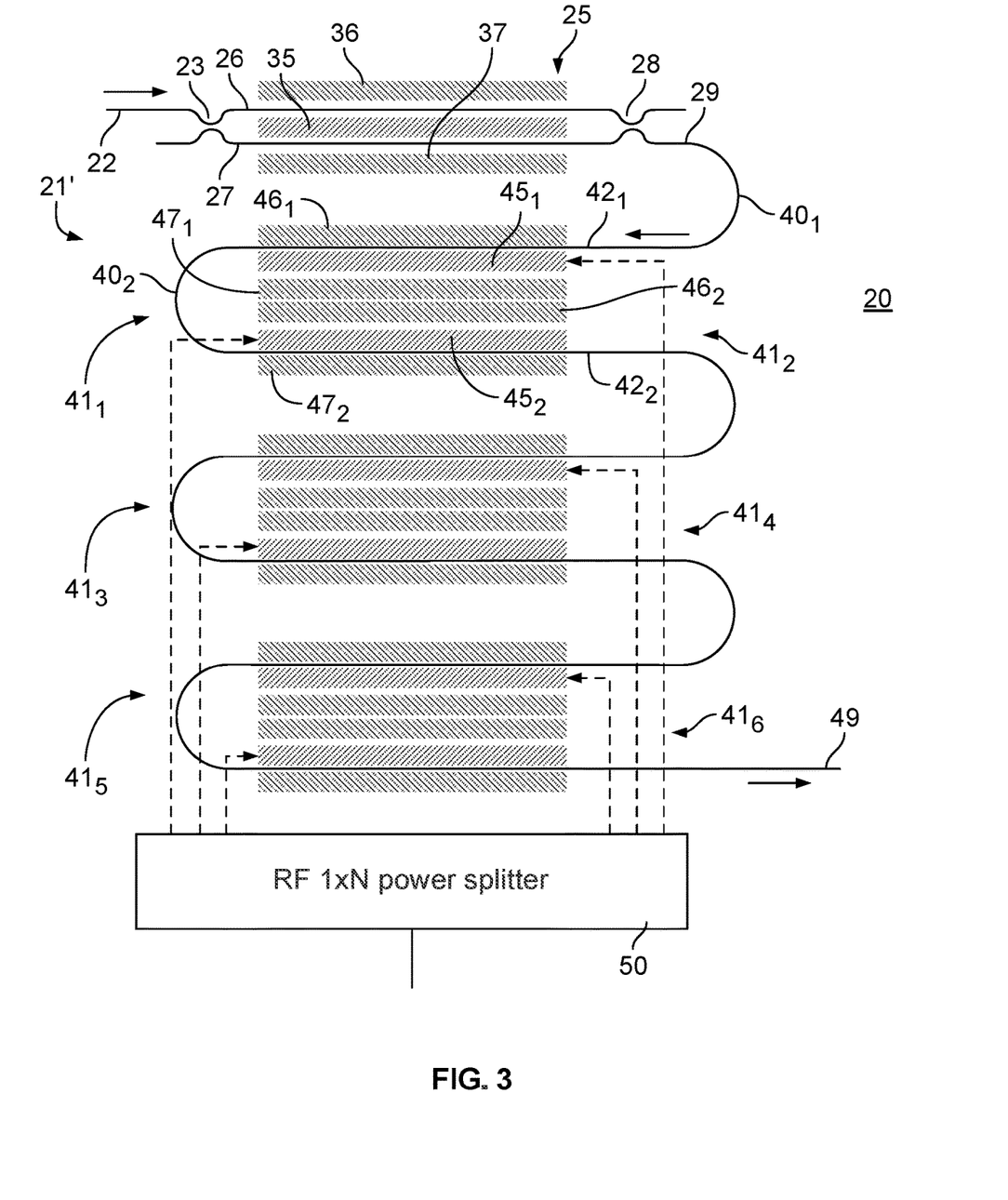
FIG. 3 is a multi-element electrode drive variation of an integrated comb generator with a single PM cascaded with an IM.

FIG. 3 illustrates a generic design for a multi-element IM/PM configuration for the electro-optic frequency comb generator 21'. Utilizing the tight bending radius of a plurality of curved connecting waveguides $40_1$ to $40_n$ of integrated thin film waveguide material, e.g. lithium niobate, extending between PM waveguides $42_1$ to $42_n$ of a plurality of PM sections $41_1$ to $41_n$ may be constructed on a small chip 20 and packed in a small area, with a plurality or all of the electrodes $45_{1-n}$, $46_{1-n}$, and $47_{1-n}$ extending parallel to each other, rather than extending over excessive length, spaced apart by a sufficient distance so as to eliminate or at least limit interference therebetween. Although various electrode configurations are possible for Y and Z cut PM waveguides $42_1$ to $42_n$. The PM sections $41_1$ to $41_n$ may be treated as a single PM 3 or a plurality of PM's $3_1$ to $3_n$ and may be driven by a common RF source 50 transmitting an RF signal, e.g. at frequency ω, with an amplitude about $V_\pi$ of that PM $3_1$ to $3_n$, which is split N ways, where N is the number of PM's or PM sections $41_1$ to $41_n$ employed. In some implementations, the RF signals delivered to each signal electrode are phase shifted by an appropriate amount to compensate for the path length the optical signal travels including along the curved connecting waveguides $40_1$ to $40_n$, i.e. in such a manner that the modulation of the cascaded set of PMs has a cumulative effect. The arrow in the picture indicates the direction of the microwave driving field, which is tuned to be the same direction of light propagation, also shown. Note that this direction will be reversed if the input and output port of the light is swapped to keep optical and microwave directions the same. Similar to the previous example (FIG. 2A), this design needs the optical signal and the RF signal for each PM section $41_1$ to $41_n$ to be phase matched, i.e. by adjusting carefully the delay between each set of microwave electrodes 35, 36 and 37 caused by the length of the transmission line from the common RF source 50 to each PM section $41_1$ to $41_n$ through adjusting the length of the optical waveguide sections $40_1$ to $40_n$ and $42_1$ to $42_n$ or the phase between each RF driving signal. In some variations, where the number N of cascaded PM stages permits, rather than a set of N RF signals being provided to the N PMs, a single RF source is used in conjunction with RF signal lines (or bent electrodes such as those depicted in FIG. 6B below) between each PM for conveying the RF signal from device to device, similar to that depicted in FIG. 1B.

Figure 4:
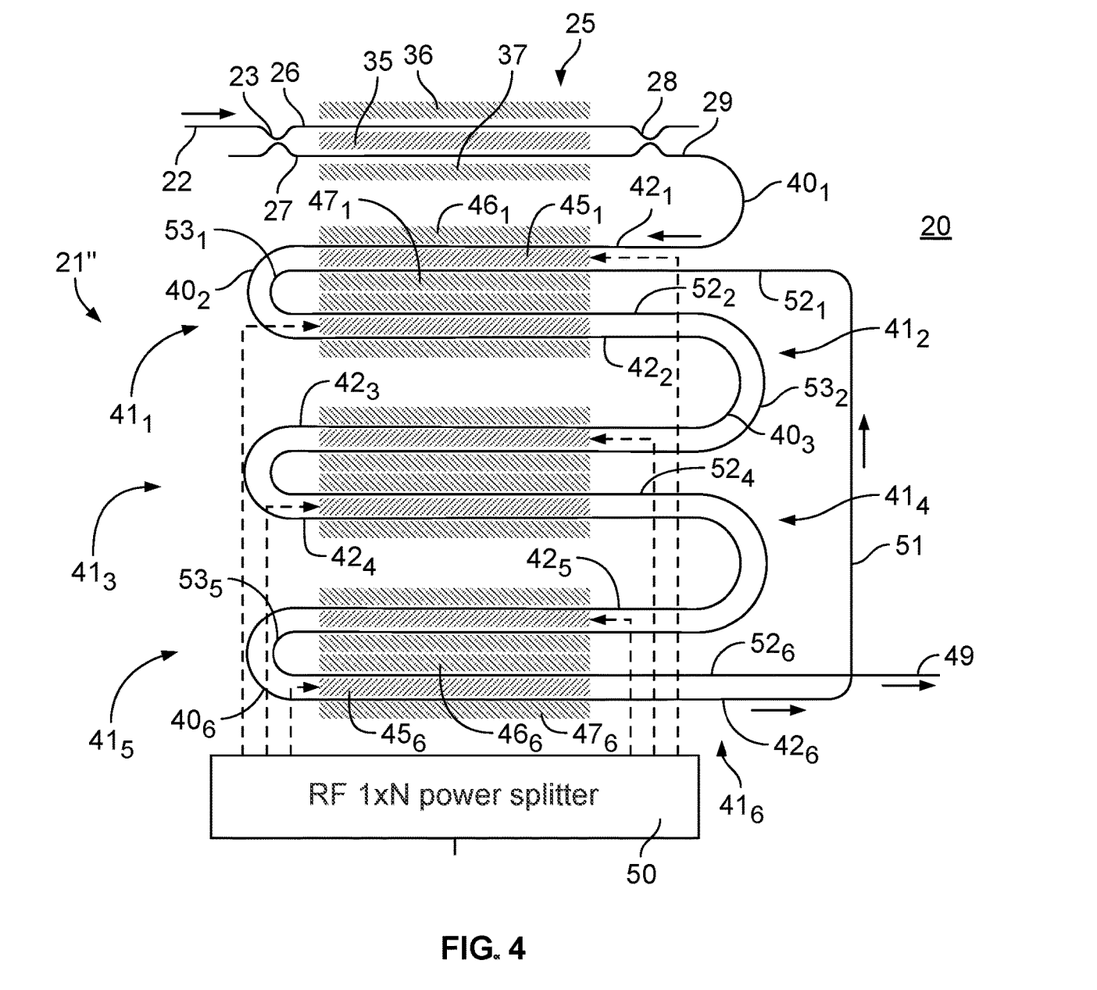
FIG. 4 is a comb generator in which the waveguides are wound back through the second electrode gap of the PM to effectively double the phase modulation strength.

FIG. 4 shows a generic design for an multi-element IM/PM configuration for an electro-optic frequency comb generator 21" with the optical waveguides passing through each PM section $41_1$ to $41_5$ twice instead of one time as the FIG. 3, thereby doubling the accumulated phase-shift. Utilizing the small bending radius of a plurality of curved waveguides $40_1$ to $40_n$ of integrated thin film waveguide material, e.g. lithium niobate, extending between PM waveguides $42_1$ to $42_n$ a plurality of PM sections $41_1$ to $41_n$ may be constructed on a small chip 20 and packed in a small area, with a plurality or all of the electrodes $45_{1-n}$, $46_{1-n}$, and $47_{1-n}$ extending parallel to each other, rather than extending over excessive length. Although various electrode configurations are possible for Y and Z cut PM waveguides $42_1$ to $42_n$. The PM sections $41_1$ to $41_n$ are driven by a common RF source 50 transmitting an RF signal, e.g. at frequency ω, which is split N ways, where N is the number of PM sections $41_1$ to $41_n$ employed. In some implementations, the RF signals delivered to each signal electrode are phase shifted by an appropriate amount to compensate for the path length the optical signal travels including along the curved connecting waveguides $40_1$ to $40_n$, i.e. in such a manner that the modulation of the cascaded set of PMs has a cumulative effect. The arrow in the picture indicates the direction of the microwave driving field, which is tuned to be the same direction of light propagation (also shown). Note that this direction will be reversed if the input and output port of the light is swapped to keep optical and microwave directions the same. Similar to the previous example, this design needs the optical and RF signals to be phase matched, i.e. by adjusting carefully the delay between each microwave electrode through adjusting the length of the optical waveguide or the phase between each RF driving signal. In addition the RF elements, such as splitters and delays, maybe co-integrated on the chip 20 or operating as standalone elements off-chip. That said, in some variations, where the number N of cascaded PM stages permits, rather than a set of N RF signals being provided to the N PMs, a single RF source is used in conjunction with RF signal lines (or bent common electrodes such as those depicted in FIG. 6B below) between each PM for conveying the RF signal from device to device, similar to that depicted in FIG. 1B.

The end of the final PM waveguide, e.g. $42_6$, is connected to a return or feedback waveguide 51, which extends back to the first PM section $41_1$, to pass along side of the first signal electrode $45_1$ as a first double pass PM waveguide $52_1$, e.g. on the opposite side of and parallel to the first PM waveguide $42_1$. A first double pass curved waveguide $53_1$ is connected at the end of the first double pass PM waveguide $52_1$ for folding the waveguide direction back through the second PM section $41_2$ to pass alongside the second signal electrode $45_2$ as a double pass PM waveguide $52_2$, e.g. on the opposite side of and parallel to the second PM waveguide $42_2$. The first double pass curved waveguide $53_1$ is concentric and parallel with the second curved waveguide $40_2$ with a different radius of curvature.

The length of the feedback waveguide 51 has to be chosen very carefully and may include an active or passive delay element, such that the light in the first double pass PM waveguide $52_1$ is in phase with the light in the first PM waveguide $42_1$ but with a $\pi$ phase shift for devices with crystal axis that extend in-plane of the device layer, e.g. device layer 11, and a 0 phase shift for z-cut devices, i.e. with crystal axes that extend out of the plane of the device layer, e.g. device layer 11. This is important because the PM waveguides $42_{1-n}$ and the double pass PM waveguides $52_{1-n}$ pass the same signal electrodes $45_{1-n}$ but the fields in the two gaps are opposite. If the length of the feedback waveguide 51 is not chosen correctly, then the second pass could, in the worst case, remove all the acquired phase and destroy all modulation.

Subsequent double pass PM waveguides, e.g. $52_2$ to $52_n$, pass along side of subsequent signal electrodes $45_2$ to $45_n$ e.g. on the opposite side of and parallel to the corresponding PM waveguide $42_2$ to $42_n$. Subsequent double pass curved waveguide $53_2$ to $53_n$ are connected at the end of the corresponding double pass PM waveguide $52_2$ to $52_n$ for folding the waveguide direction back through the next PM section $41_2$ to $41_n$. The double pass curved waveguides $53_2$ to $53_n$ are concentric and parallel with the curved waveguides $40_2$ to $40_n$ with different radiuses of curvature, i.e. alternating between larger on the outside and smaller on the inside of the curved waveguides $40_2$ to $40_n$. The end of the last double pass PM waveguide, e.g. $52_6$, is connected to the comb output port or waveguide 49.

The double pass PM waveguides $52_1$ to $52_n$ may be comprised of single mode waveguides or a combination of single mode and multimode waveguides, as hereinbefore defined with reference to the PM waveguides $42_1$ to $42_n$. The advantage with the double pass PM waveguides $52_1$ to $52_n$ is that the modulation strength for the same number of PM sections $41_1$ to $41_n$ will be doubled. The drawback is that the waveguide would need to cross each other once, e.g. the feedback waveguide 51 and the comb output waveguide 49, which usually is not a serious problem and can be mitigated by low loss waveguide cross designs.

Figure 5A:
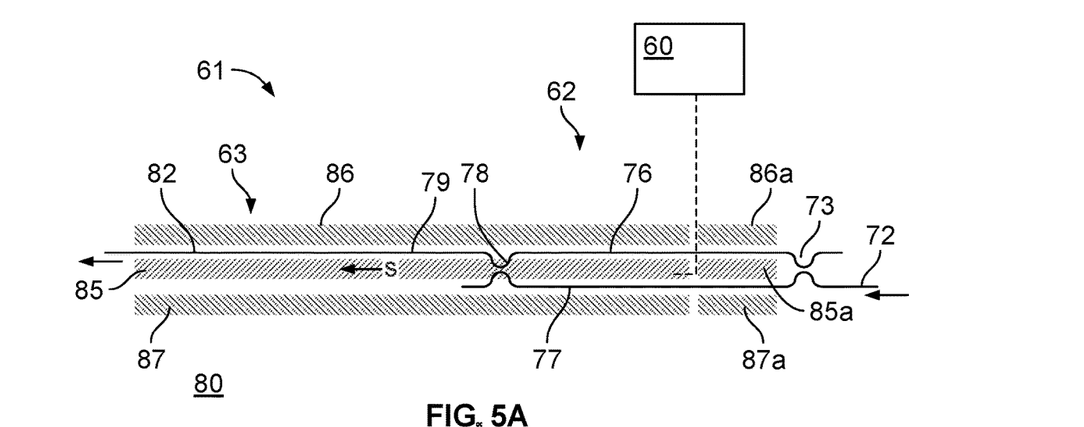
FIG. 5A is a single electrode driven by a single RF source with single pass PMs.
Figure 5B:
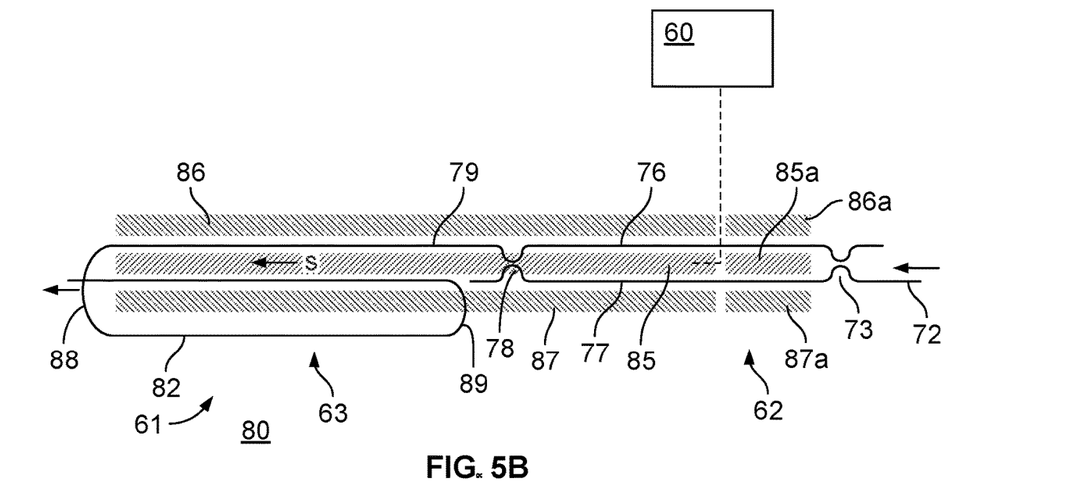
FIG. 5B is a single electrode driven by a single RF source with two pass PMs.
Figure 5C:
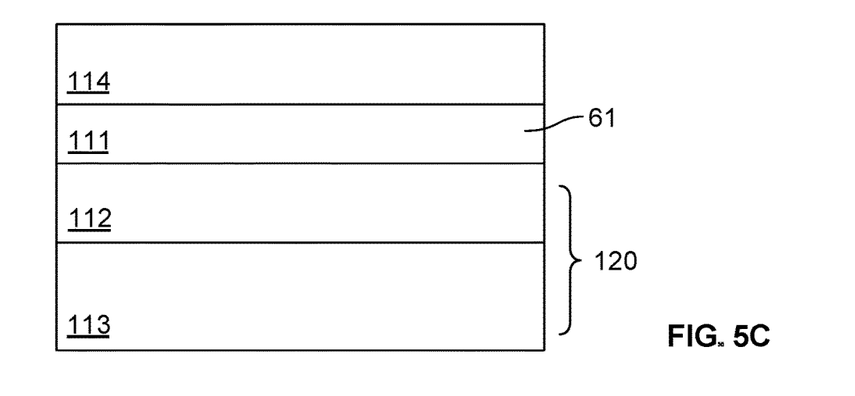
FIG. 5C is a cross-sectional view of the comb generator of FIG. 5A or 5B.

FIGS. 5A to 5C illustrate two design variations of an electro-optic comb generator 61, which includes only one common RF electrode 85 for both an IM 62 and a PM 63, e.g. at frequency ω, that defines the spectral separation of the comb lines or the wavelength channel spacing, e.g. 10-100 GHz, with an amplitude about $V_\pi$ of the IM 62. FIG. 5A illustrates a single IM 62, providing the impulse modulation functionality as in the IM 2 cascaded with the single PM 63, providing phase modulation functionality as in a single PM 3, although additional PM's and IM's are possible. As illustrated in FIG. 1B, this variation utilizes a single RF electrode 85 common to both the IM 62 and the PM 63 to pass the RF signal from the IM 62 to the PM 63. FIG. 5B illustrates a design in which the waveguides are folded back through the second half of the PM 63 to effectively double the phase modulation strength, i.e. increase the number of sidebands, at the expense of limited possible RF driving frequencies. These designs dramatically simplifies the required RF signal input, i.e. reduced to only one RF signal input port, at the expense of a preferred fixed value of RF input power to both the IM's and PM's, instead of independently providing different amounts of RF input power to the IM's and the PM's, as in the comb generators 21, 21' and 21".

The comb generator 61 includes an input waveguide or port 72 optically coupled to a first coupler 73, e.g. a Y-splitter or a 2×2 coupler with one arm terminated, for splitting an input optical signal into first and second sub-beams, which propagate along first and second arms 76 and 77, to a second coupler 78, e.g. a Y-splitter or 2×2 coupler, for recombining, e.g. interfering, the first and second sub-beams for output an IM output waveguide or port 79. Each of the first and second arms 76 and 77 may comprise single mode waveguide section or a combination of single mode narrow waveguide sections, as hereinbefore described, and multimode wide waveguide sections, as herein before described. The connecting, i.e. single mode, sections may include non-trivial guiding structures, such as the first and second couplers 73 and 78. The multimode sections may be significantly longer than the single mode sections, e.g. commonly by a factor of 10 to 100, Figure not to scale. The multimode sections may include simple structures, e.g. a straight line and potentially shallow bends. The multimode sections and the single mode sections are connected with tapers, which may be designed such that only the fundamental mode of the multimode waveguide is excited. Ideally, multimode sections are provided adjacent to, beside or below, signal electrode 85 and ground electrodes 86 and 87.

The IM output waveguide 79 may be optically coupled to the PM 63. The PM 63 includes a first PM waveguide 82, which may comprise a single mode waveguide section or a combination of single mode narrow waveguide sections, and multimode wide waveguide sections, as hereinbefore defined. The multimode sections and the single mode sections are connected with tapers, which may be designed such that only the fundamental mode of the multimode waveguide is excited. Ideally, multimode sections are provided adjacent to, beside or below, the signal electrode 85 and first and second ground electrodes 86 and 87, respectively.

The PM waveguide 82 may include one or more tight curved waveguides, e.g. first and second tight curved waveguides 88 and 89, enabling the PM waveguide 82 to be folded back to extend along the other side of the signal electrode 85, whereby the sections of the PM waveguide 82, ideally multimode sections, extend parallel to each other on opposite sides of the electrode 85. The difference in black level for the shaded regions in the electrodes 85, 86 and 87 indicates different electrode polarity. The electrodes 85, 86 and 87 are formed either in a capacitive fashion or configured in a transmission line design. In the transmission line design the microwave travels together with the light where their group velocity is roughly matched. In the illustrated embodiments of FIGS. 5A and 5B, the IM 62 and the PM 63 may be driven with one microwave source 60 configured to transmit one RF signal at frequency co, that defines the spectral separation of the comb lines or the wavelength channel spacing, e.g. 10-100 GHz, with an amplitude about $V\pi$ of the IM 62. The separated optional electrode 85a, 86a and 87a are DC electrodes for DC biasing in the IM 62 via a separate DC power source. The DC biasing can also be achieved by either electro-optic or other means such as thermo-optic or piezoelectric tuning. The microwave power may be configured so that it induces about a $\pi$ phase shift in the IM 62 while inducing other values of phase shifts in the PM 63. In both FIGS. 5A and 5B, the devices are broadband for input optical frequencies, but FIG. 5B is generally narrow band for microwave driving frequencies. This is because the optical waveguide sections of PM waveguide 82 that winds back need to be phase matched to the microwave electrodes 85. This is done by carefully choosing the length of the PM waveguide 82 so that the optical delay is an integer multiple of the microwave half-wavelength in the electrodes 85, 86 and 87. An output waveguide or port 90 is provided at the end of the PM waveguide 82.

The illustrated IM 62 and PM 63 may comprise X-cut Lithium Niobate ($LiNbO_3$ or LN), Lithium Tantalate (LT) or other electro-optic material with an electro-optic constant >10 pm/V, design including the central signal electrodes 85 adjacent to the outer edges of the first and second arms 76 and 77, and PM waveguide 82, respectively; however, a Z-cut LN or LT design with the signal electrode 85 and one of the ground electrodes over top of the first and second arms 76 and 77, or the PM waveguide 82, respectively, is also within the scope of the invention. Any other waveguide material, e.g. silicon, and electrode control for transmitting an electronic modulation signal to the optical signal is within the scope of the invention. Preferably, the waveguides comprising the input waveguide 72, the first coupler 73, the first and second arms 76 and 77, the second coupler 78, the IM output waveguide 79, the first, and the PM waveguide 82 are comprised of thin film lithium niobate or lithium tantalate, which may be fabricated in accordance with the methods disclosed in WO 2018/031916 filed Aug. 11, 2017 by Wang et al, which is incorporated herein by reference.

Ideally, the comb generator 61 is formed in a device layer 111 on a substrate 120, including a lower cladding layer 112 and a handle layer 113, as in FIGS. 2B and 5C. In a preferred embodiment, the waveguides 72, 73, 76, 77, 78, 79, and 82 may be comprised of single crystal Lithium Niobate ($LiNbO_3$ or LN) or Lithium Tantalate ($LiTaO_3$ or LT), and the substrate 120 is comprised of a Lithium Niobate on insulator (LNOI) structure (or Lithium Tantalate on insulator structure (LTOI)), including a silicon dioxide ($SiO_2$) lower cladding layer 112 on a silicon (Si) handle layer 113. Note that the substrate 120 can be other materials such as quartz, sapphire, fused silica. The lower cladding layer 112 can be any planarized material that has a lower refractive index than the waveguide, e.g. LN or LT, material, including air (suspended structures). An upper cladding layer 114 with lower refractive index than the waveguide, e.g. LN or LT, material, e.g. an upper $SiO_2$, may also be provided covering the modulator structure, i.e. first and second arms 76 and 77, and first and second couplers 73 and 78 in the device layer 111. However, other suitable waveguide materials exhibiting electro-optic effect with an electro-optic coefficient >10 pm/V, such as gallium arsenide (GaAs), indium phosphide (InP) and barium titanate (BTO, $BaTiO_3$), are also within the scope of the invention. It should be noted that variations depicted in FIGS. 5A and 5B, in which a single RF source is shared between the IM and the PM, multiple RF sources or expensive RF phase shifters are avoided, decreasing complexity.

Figure 6A:
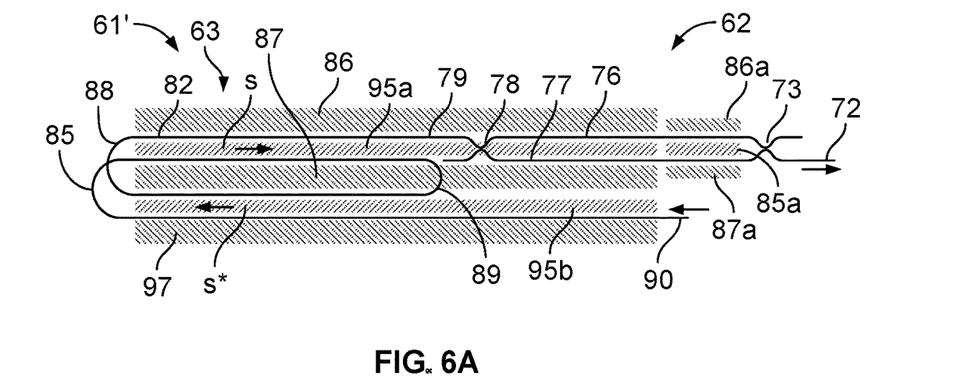
FIG. 6A illustrates a multi-pass differential drive comb generator.

FIG. 6A illustrates a design for a differential drives comb generator 61' in which the IM 62 is similar to the IM 62 in FIG. 5A, but two RF signals from two parallel RF electrodes 95a and 95b with the same frequency, but opposite phase, are used on the PM waveguide 82 from the left and right side. The second RF electrode 95b may be disposed between the second ground electrode 87 and a third ground electrode 97 all extending parallel to each other. The first and second tight curved waveguides 88 and 89 may be included to wrap the PM waveguide 82 back to extend between the second RF electrode 95b and the third ground electrode 97, as in FIG. 5B, or the third tight curved waveguide 89 may be excluded, as in FIG. 5A, whereby the PM waveguide 82 is passed directly by the second RF electrode 95b in sequence with the first RF electrode 95a. The RF signals from the RF electrodes 95a and 95b may include differential voltages +V and -V about 180° out of phase which is preferable to some applications that has a differential RF driver. As described above, in some variations the lengths of curved waveguides 88 and 85 and 89 are tuned to increase the cumulative modulation effect. It should be noted that in the variation depicted in FIG. 6A, in which a single RF source is shared between the IM 62 and the top portion of the PM 63, multiple RF sources or expensive RF phase shifters (for driving these devices) are avoided, decreasing complexity.

Figure 6B:
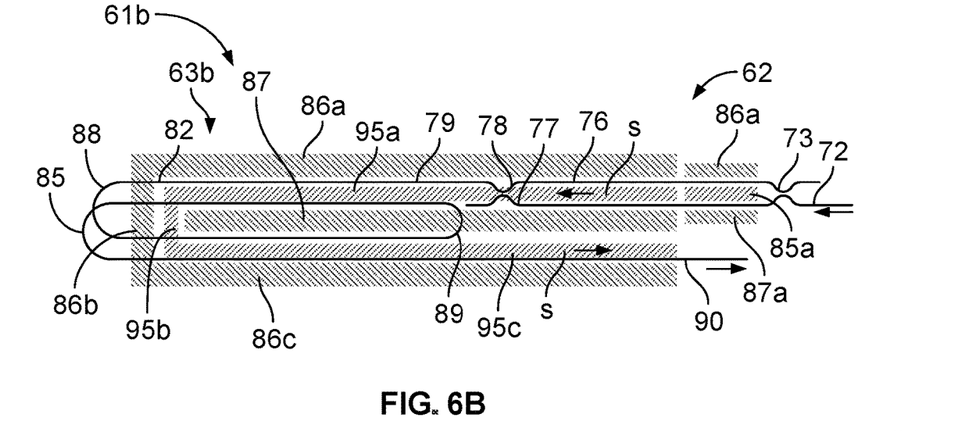
FIG. 6B is a multi-pass single electrode comb generator variation driven by a single RF source.

FIG. 6B is a multi-pass single electrode comb generator 61b variation in which the IM 62 is similar to the IM 62 in FIGS. 5A and 6A, but a single RF signal drives a bent RF electrode 95a, 95b, 95c in a PM 63b which also includes a bent first ground electrode 86a, 86b, 86c. A waveguide 82 in the PM 63b emerges from the IM 62 between a first portion of the RF electrode disposed between a first portion of the first ground electrode 86a and a second ground electrode 87. A third portion of the RF electrode 95c is disposed between a third portion of the first ground electrode 86c and the second ground electrode 87 all extending parallel to each other and the first portion of the RF electrode 95a and the first portion of the first ground electrode 86a. The first and second tight curved waveguides 88 and 89 may be included to wrap the PM waveguide 82 back to extend between the third portion of the RF electrode 95c and the second ground electrode 87, and to extend between the first portion of the RF electrode 95a and the second ground electrode 87, as in FIG. 5B, and a third tight curved waveguide 85 may be included to wrap the PM waveguide 82 back again this time to extend between the third portion of the RF electrode 95c and the third portion of the first ground electrode 86c. The first ground electrode 86a, 86b, 86c and the RF electrode 95a, 95b, 95c, are each bent such that there is a connection portion or second portion of each 86b, 95b connecting the first portions 86a, 95a to the third portions 86c, 95c thereof. In the variation depicted in FIG. 6B, these second portions 86b, 95b are spaced apart from the first and third curved waveguides 88, 85 and cross the PM waveguide 82 at right angles. As described above, in some variations the lengths of curved waveguides 88, 89, and 85, and the lengths of the second portions of the RF electrode 95b and the first ground electrode 86b are tuned to optimize the cumulative modulation effect. It should be noted that in the variation depicted in FIG. 6B, in which a single RF source is shared between the IM 62 and the PM 63b, multiple RF sources or expensive RF phase shifters (for driving these devices) are avoided, decreasing complexity.

Figure 6C:
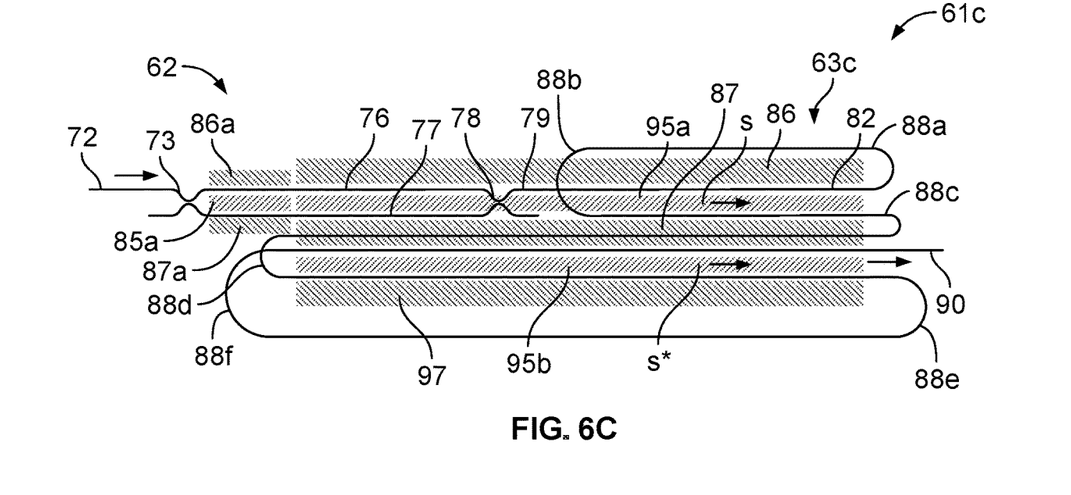
FIG. 6C illustrates a further variation of a multi-pass differential drive comb generator.

FIG. 6C illustrates a further variation of a multi-pass differential drive comb generator 61c in which, similarly to FIG. 6A, two RF signals from two parallel RF electrodes 95a and 95b with the same frequency, but opposite phase, are used on the PM waveguide 82, but from the direction, left to right, to match the direction of the optical signals. The first RF electrode 95a is disposed parallel to a first ground electrode 86, and the second RF electrode 95b is disposed between a second ground electrode 87 and a third ground electrode 97 all extending parallel to each other. A first curved waveguide 88a is included to wrap the PM waveguide 82 back around the first ground electrode 86 to a second curved waveguide 88b which wraps the PM waveguide 82 to extend between the first RF electrode 95a and the second ground electrode 87. A third curved waveguide 88c wraps the PM waveguide 82 back along the middle of the second ground electrode 87, where there is substantially no electric field to affect a modulation of the optical signals passing through the PM waveguide 82. Next, a fourth curved waveguide 88d wraps the PM waveguide 82 to extend between the second RF electrode 95b and the third ground electrode 97, while a fifth curved waveguide 88e wraps the PM waveguide 82 back around the third ground electrode 97 to a sixth curved waveguide 88f which wraps the PM waveguide 82 to extend between the second RF electrode 95b and the second ground electrode 87. The RF signals from the RF electrodes 95a and 95b may include differential voltages +V and −V about 180° out of phase which is preferable to some applications that has a differential RF driver. As described above, in some variations the lengths of curved waveguides 88a-88f are tuned to optimize the cumulative modulation effect. It should be noted that in the variation depicted in FIG. 6C, in which a single RF source is shared between the IM 62 and the top portion of the PM 63c, multiple RF sources or expensive RF phase shifters (for driving these devices) are avoided, decreasing complexity.

Figure 7:
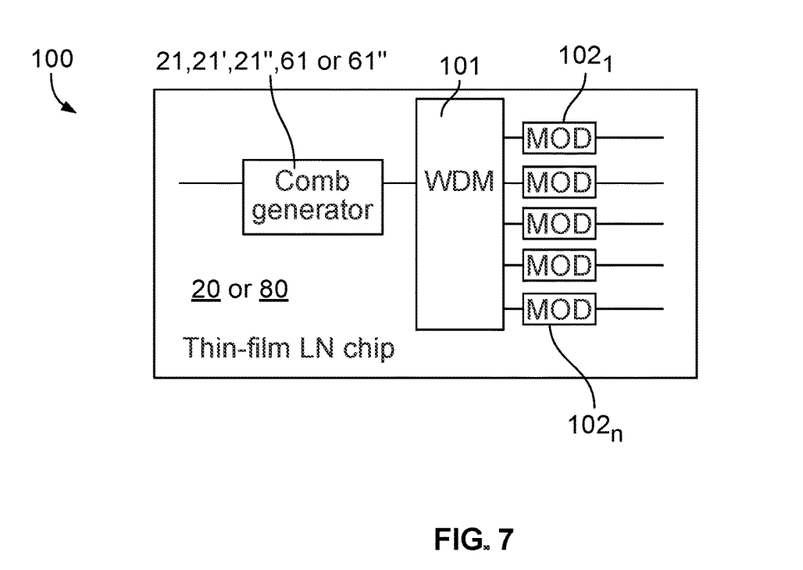
FIG. 7 is an example of comb source and modulator co-integration concept where comb source and modulators are integrated on the same platform.

FIG. 7 illustrates an example of a multi-wavelength component 100 on a single chip 20 or 80 including a frequency comb generator, e.g. 21, 21', 21", 61, 61', 61b, or 61c to generate a frequency comb, a wavelength division multiplexing (WDM) filter 101 to filter particular lines of the comb into spatially-separated, individual constituent wavelength optical signals, and a plurality of modulators $102_1$ to $102_n$ configured to modulate each individual wavelength optical signal on the same material platform. A lithium niobate (or other aforementioned material) thin-film platform is ideal for this because it possess all the necessary optical element and electro-optic properties to complete such functionalities.

Figure 8:
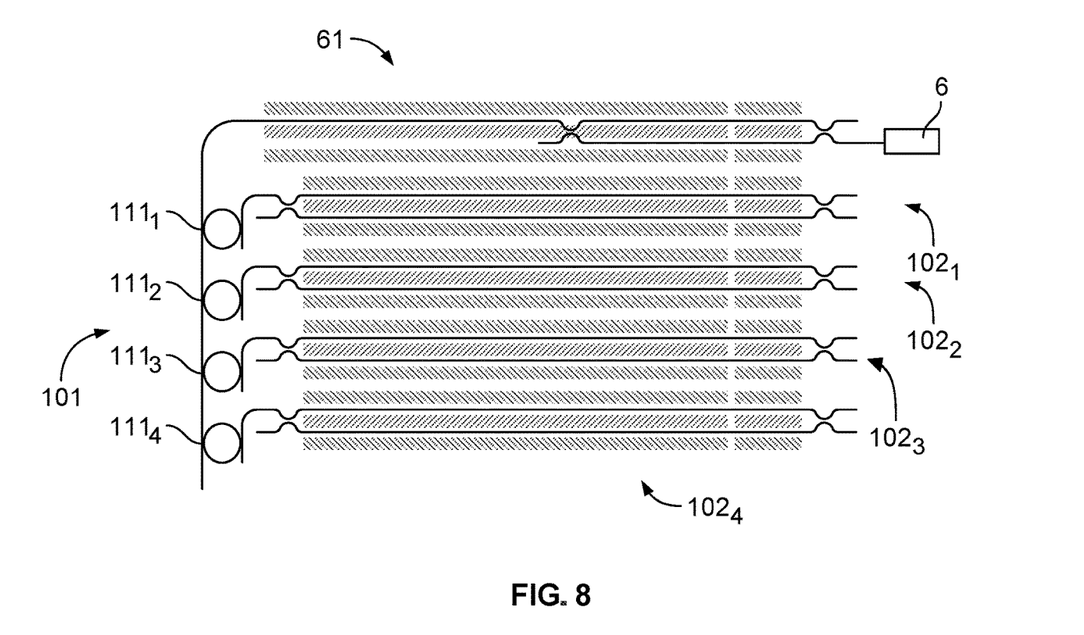
FIG. 8 illustrates a possible implementation of an integrated comb source and modulators integrated on the same platform.

FIG. 8 illustrates an example of such a layout for the application described in FIG. 7. The comb generator, e.g. illustrated comb generator 61 although any of the aforementioned comb generators 21, 21', 21", 61, 61', 61b, or 61c is possible, generates an optical frequency comb from a CW input laser 6. The generated comb is then transmitted to the WDM filter 101, e.g. a plurality of ring resonators $111_1$ to $111_n$; which may also be replaced with any suitable WDM filter, such as an arrayed waveguide grating, to filter out and spatially separate individual optical wavelength signals. The individual optical wavelength signals are then filtered and modulated through the plurality of individual modulators $102_1$ to $102_n$, which may be simple IMs or in-phase and quadrature (IQ) modulators.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An electro-optic device, comprising:
an intensity modulator (IM) residing on a substrate;
a first phase modulator (PM) optically coupled to the IM and residing on the substrate;
a second PM optically coupled to the first PM, the IM, the first PM, and the second PM sharing a waveguide structure including lithium, the second PM residing on the substrate; and
a continuous integrated electrode structure on the substrate, the continuous integrated electrode structure including a first electrode structure for the IM, a second electrode structure for the first PM, and a third electrode structure for the second PM, the first electrode structure extending through the IM but not extending through the first PM or the second PM;
wherein the IM, the first PM, and the second PM are driven by at least one RF source providing an RF signal, the RF signal being provided to the IM, the first PM, and the second PM by the continuous integrated electrode structure.

2. The electro-optic device of claim 1, wherein each of the IM, first PM, and the second PM share an optical path length.

3. The electro-optic device of claim 1, wherein the waveguide structure includes at least one of lithium niobate or lithium tantalate.

4. The electro-optic device of claim 1, wherein the IM, the first PM, and the second PM are configured to receive light from at least one continuous wave light source and generate a plurality of optical frequencies corresponding to a frequency comb generator.

5. The electro-optic device of claim 4, wherein a wavelength division multiplexer is coupled with the electro-optic device, the wavelength division multiplexer including a plurality of outputs corresponding to a plurality of optical frequency ranges for a plurality of portions of the plurality of optical frequencies.

6. The electro-optic device of claim 5, wherein the wavelength division multiplexer includes plurality of ring resonators.

7. The electro-optic device of claim 6, wherein a plurality of optical modulators is coupled with the plurality of outputs of the wavelength division multiplexer and is on the substrate.

8. The electro-optic device of claim 1, wherein the IM, the first PM, and the second PM are part of an electro-optic frequency comb generator, the electro-optic device further comprising:
a plurality of optical modulators on the substrate and coupled with the electro-optic frequency comb generator, the electro-optic frequency comb generator and the plurality of optical modulators being aligned in a linear array.

9. An electro-optic device, comprising:
a substrate,
an intensity modulator (IM) on the substrate;
a first phase modulator (PM) optically coupled to the IM on the substrate;
a second PM optically coupled to the first PM and on the substrate;
an electrode structure on the substrate and including a first electrode structure for the IM, a second electrode structure for the first PM, and a third electrode structure for the second PM integrated to form a single continuous electrode structure, the IM, the first PM, and the second PM being included in an electro-optic frequency comb generator; and a plurality of optical modulators on the substrate and optically coupled with the electro-optic frequency comb generator, the plurality of optical modulators including a plurality of waveguide structures including lithium;

wherein the IM, the first PM, and the second PM share a waveguide structure including lithium; and wherein each of the IM, first PM, and the second PM share an optical path length.

10. The electro-optic device of claim 9, wherein the waveguide structure includes at least one of lithium niobate or lithium tantalate.

11. The electro-optic device of claim 10, wherein the IM, the first PM, and the second PM are configured to receive light from at least one continuous wave light source and generate a plurality of optical frequencies corresponding to the electro-optic frequency comb generator.

12. The electro-optic device of claim 11, wherein a wavelength division multiplexer is coupled with the electro-optic device, the wavelength division multiplexer including a plurality of outputs corresponding to a plurality of optical frequency ranges for a plurality of portions of the plurality of optical frequencies.

13. The electro-optic device of claim 12, wherein the wavelength division multiplexer includes a plurality of ring resonators.

14. The electro-optic device of claim 13, wherein the plurality of optical modulators is coupled with the plurality of outputs of the wavelength division multiplexer.

15. The electro-optic device of claim 9 wherein the electro-optic frequency comb generator and the plurality of optical modulators are laid out on the substrate in a linear array.

16. The electro-optic device of claim 9, wherein the first electrode structure of the single continuous electrode structure extends through the IM but not extending through the first PM or the second PM.

17. A method for providing an electro-optic device, comprising:

providing, on a substrate, a waveguide structure for an intensity modulator (IM), a first phase modulator (PM) optically coupled to the IM, and a second PM optically coupled to the first PM, the waveguide structure including lithium; and providing, on the substrate, a continuous integrated electrode structure including a first electrode structure for the IM, a second electrode structure for the first PM, and a third electrode structure for the second PM, the first electrode structure extending through the IM but not extending through the first PM or the second PM;

wherein the IM, the first PM, and the second PM are driven by at least one RF source providing an RF signal, the RF signal being provided to the IM, the first PM, and the second PM by the continuous integrated electrode structure.

18. The method of claim 17, wherein the IM, the first PM, and the second PM are configured to receive light from at least one continuous wave light source and generate a plurality of optical frequencies corresponding to a frequency comb generator.

19. The method of claim 18, further comprising:

providing a wavelength division multiplexer coupled with the frequency comb generator, the wavelength division multiplexer including a plurality of outputs corresponding to a plurality of optical frequency ranges for a plurality of portions of the plurality of optical frequencies.

20. The method of claim 19, further comprising:

providing a plurality of optical modulators are coupled with the plurality of outputs of the wavelength division multiplexer.

* * * * *